Sept. 19, 1950    R. B. BASSETT    2,522,982
METHOD OF MAKING CERAMIC GRANULES
Filed April 6, 1946
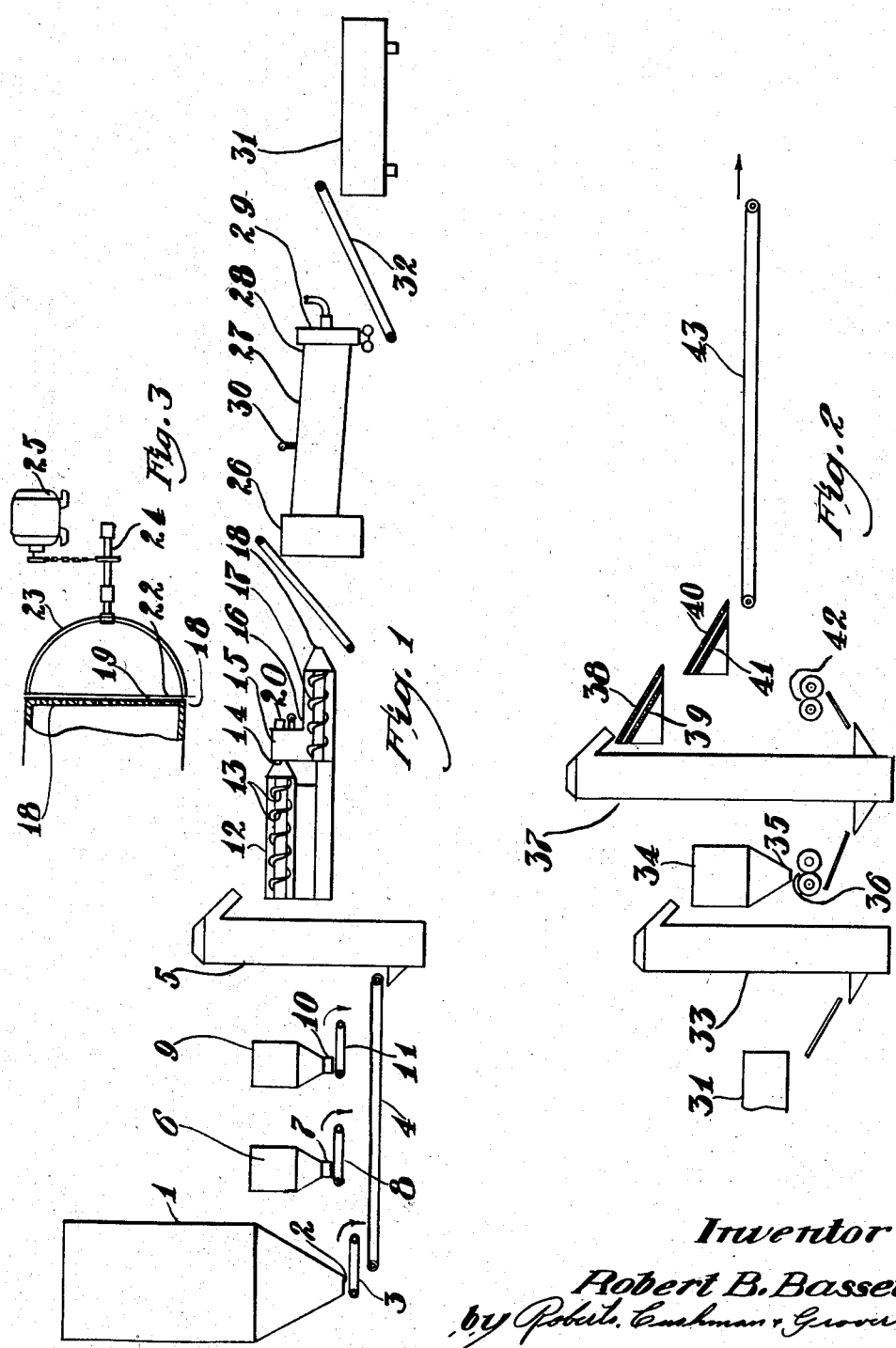
Inventor
Robert B. Bassett
by Roberts, Cushman & Grover
Att'ys.

UNITED STATES PATENT OFFICE 2,522,982

METHOD OF MAKING CERAMIC GRANULES

Robert B. Bassett, Darlington, Pa., assignor to Alfred W. Whitford, Watsontown, Pa.

Application April 6, 1946, Serial No. 660,079

4 Claims. (Cl. 25—156)

This invention relates to a method of making ceramic granular materials, and to the resulting products.

Ceramic materials in granular form are found useful for many purposes. In fact the demands for them in this form are not only great but have become specific in the requirements or standards of the arts in which they are employed. Thus, ceramic granules are extensively applied to roofing materials and these are commonly called "roofing granules." Their properties and the conditions which they must comply with or withstand are very exacting, both in respect of their application to roofing materials and in respect of their subsequent resistance to weather and wear for long periods of time.

Other problems, incident to the manufacture of ceramic granules in general and roofing granules in particular, refer to raw materials which are suitable, practicable procedures for preparation, and economy both of operations and materials used. These, in fact, determine the practical utility of any given product for the purpose.

It is accordingly an object of the present invention to provide a procedure for the preparation of ceramic granular materials, and particularly roofing granules, which shall be appreciable to available raw materials, capable of convenient and economical operation, on a small or large scale, with economy of raw material, and a high or complete conversion of the raw material into granules of the desired sizes and quality. Other objects will appear from the following disclosure.

The raw material used is characteristically a firmly consolidated, naturally occurring clay, (such as that known as "Lower Kittaning Deposit, Vein No. 3, Pennsylvanian" and occurring at Darlington, Beaver County, Pennsylvania, which is nearly white) or more dense argillaceous shales (such as Red Brick Shale, of Watsontown Valley, Pennsylvania). With the latter, however, addition of a plasticity component may be desirable. But other clays of similar dense, hard, properties and fire-hardening characteristics may be employed, as will be more fully pointed out below.

The raw argillaceous material is first mined and then crushed in any suitable way to the approximate size or sizes of granules desired. This may be conducted with a view to reducing all of the material to the granule size or sizes required, by re-crushing the oversize material, if the latter has no appropriate application or use in this form. Granules thus produced which are of the particular size or range of sizes desired are separated from the smaller sizes or fines, and dust, by screening, and they may also be separated from each other into selective sizes. These sized granules may be subjected to heat to harden them and to other treatments to develop various desired properties, and constitute a highly satisfactory finished product accordingly, without further treatment.

The finer sizes and dust which have been separated from the graded sizes, however, at the present time constitute a waste product of substantial proportions. These fines and dust not only represent a large part of the raw material which is mined but also a larger proportion of the power consumed in the crushing, sizing and handling operations. They also require additional transportation for disposal and, when dumped, occupy a constantly increasing area which cannot be utilized for any other purpose.

Since the granule sizes ordinarily preferred for roofing granules are approximately 8 or 10 mesh to 35 mesh, or those which will pass through a screen having 8 to 10 meshes per linear inch, and which will be retained upon a screen having 35 openings per linear inch, the finer sizes and dust will be composed of particles which will pass through a 35 mesh screen. Such screens have openings of 0.50 mm. or 0.0197". Such fines and dust constitute the raw material which, by the present invention, is converted into a finished ceramic granular product, which is equal to or in some respects even superior to the separated sized granules of the crushed, naturally occurring firmly consolidated clay or shale.

It may be pointed out that it would be possible to reduce all of the argillaceous raw material to the order of particle sizes of the fines and dust, and in some instances this may be found desirable to do, especially where it is desired to apply the invention to softer clays which do not yield coarse sizes of firm granules upon crushing and screening to separate such sizes. But such procedures are not preferred where a substantial part of the raw material can be brought to the required sizes in the initial crushing operations and suitably developed in this form, as above indicated.

The fines and dust present the relationship of substantially sized particles, ranging from .0197" or about ½ millimeter, downwardly, to microscopic particles. Such a gradation of particle sizes permits or at least makes possible a close packing of the finer particles within the interstices between the coarser particles, to develop a density comparable to that of the solid uncrushed, naturally compacted material. But this will not be realized in practice, for two reasons, inter alia. One is that dry solid particles of random shapes will not slip freely over one another, to permit compact rearrangement and consolidation of a mixture of them. Another is that finely divided solid powders not only occlude gases, such as the air, in consequence of their resistance to slippage and consolidation, but also adsorb gases over their extensive surface areas, which keep the particles apart and out of intimate or actual contact with each other.

Upon adding water to such mixtures of argillaceous fines and dust, the occluded gases, or air, are quite rapidly displaced and the particles wetted and the whole reduced to a plastic mass. But such wetting of the particles is not complete, and the adsorbed gases, as well as some of the occluded gases, may be retained in such a mixture.

It is now found that if such a mixture, wetted, but just to a stiff plasticity, is subjected to a vacuum, in broken-up or disintegrated condition, both occluded and adsorbed gases retained by and between the solid particles, as well as those which may be dissolved in the moisture of the mixture, are liberated and removed from the mass.

This is not practicable with slurries or freely plastic mixtures, in which the liquid component of the mixture covers over and hence effectively seals the solid particles and the spaces between them against such liberation and separation of the occluded and adsorbed gases. But in stiffly plastic mixtures where the solid particles are wetted by a thin film, to the extent of being even a non-continuous film, such protection is not afforded to the occluded or adsorbed gases retained thereby, and they are liberated, coalesced, and removed from the mass if sufficiently comminuted or disintegrated and separated to let the gases segregate and pass off.

It would be possible to effect a similar treatment upon the fines and dust, in their natural or dry condition, as they come from the crushing and screening operations. But in such a case, the evacuated fines and dust would tend to escape into the vacuum apparatus. It would also be necessary to add water and prepare the plastic mixture therefrom while continuously maintaining the vacuum. It would also be advisable or necessary to employ water free from dissolved, adsorbed or entrained gases, otherwise a gaseous component would be introduced from this source. It would also probably necessitate the maintenance of a vacuum upon the mixture until after the subsequent shaping operations (hereinafter to be described) where completed.

In either case the just wet and plastic clay is thus deprived of its dissolved, occluded and adsorbed gas or air content and while still in this condition is consolidated to a dense, continuous mass or steam, as by passing it (while still under vacuum), through an extrusion orifice. The extruded mass or stream may be of various shapes in cross-section, which will modify the characteristics of the resulting plastic column, but is of a size or diameter at least twice the diameter of the average size of the granular product to be made. This assures that a predominance of the surfaces of the ultimate granules shall be fracture-surfaces and instead of the more smooth-sided surfaces of the extruded column, both of which are subjected to the high temperatures, abrasion, and atmospheres of the furnace and cooling operations to be described.

The dense, just-plastic, though uniformly moist column is next broken or cut into lengths convenient for subsequent handling and firing and screening operations. These broken pieces, which resemble "noodles," are then delivered into the flue end of a kiln (which may be direct fired with combustion gases only, or provided with a more accurately controlled atmosphere) and conveyed therethrough, countercurrent to the hot gases at a temperature and for a sufficient time to develop their hardness, strength, and other properties desired in the finished granule product. They are then cooled, in an inert or controlled gaseous atmosphere, substantially to room temperature.

The hardened noodles are then crushed down to granules of the desired maximum size, and screened or otherwise separated to the size or range of sizes desired in the finished granular ceramic product. Finer sizes and dust attendant upon such final crushing operation may be added to the original mixture, in appropriate proportions, or they may be applied to the external surfaces of the noodles, while in plastic condition or during the firing operation, or both. But it is found that the fine sizes and dust of the fire-hardened ceramic material present characteristics and uses independent of re-use in the process itself, so that they constitute, in so far as they are produced in excess of such uses, valuable products in themselves. Among such properties may be mentioned their hardness, non-crushing strength, individual higher density, but collective porosity, extensive surfaces and surface areas, colloidal subdivision of the smaller particles, of which they are composed, temperature resistance, and coloring characteristics.

A preferred and representative example of carrying out the invention in practical operations will be described with reference to the accompanying drawings in which:

Fig. 1 is a diagrammatic illustration of the apparatus employed, arranged (from left to right) in sequence of the operations, as conducted in the process;

Fig. 2 is a continuation of the diagrammatic illustration in Fig. 1; and

Fig. 3 is an enlarged detail of the cutting-off device associated with the outlet of the extrusion machine.

The argillaceous raw fines and dust (35 mesh and finer) as obtained by crushing and screening the run of mine material from the Lower Kittaning deposit of clay above referred to, for example, are delivered into the storage bin 1. From here they may be fed continuously, by gravity, in a controlled stream from the gate valve 2, at the bottom onto a weighing conveyor belt 3 and thence onto a continuous conveyor belt 4 leading to and delivering into the elevator 5.

This may constitute the entire raw material used in the process, and in this event presents a dry, powdery, mixture of fine particles grading from definitely sized particles down to an impalpable dust, including colloidal dimensions of subdivision. The sizes of particles which it contains are uniformly mixed and tend to remain so, both while dry and in subsequent mixing, due to the conditions already described.

If a colored granule is desired, appropriate, finely divided dry colorants may be added from the storage bin 6, regulated through the control valve 7 and weighing conveyor 8, and delivered to the conveyor belt 4.

Likewise, if fines or dust, which have been through the firing operation, are to be employed in the mixture, these may be drawn from the storage bin 9, regulated by valve 10 and weighing conveyor, 11, and likewise delivered to the conveyor belt 4.

As coloring agent, various inorganic salts or oxides may be used, either in solution or aqueous suspension. But these should be added sparingly at this stage (and dry) or subsequently in the pug mill (in solution) and in either case the proportions carefully calculated in terms of the resulting mixed product and plasticity of the mixture, as developed in the pug mill.

The raw material, or mixture of raw materials, as thus prepared, is delivered in a fairly continuous stream into the elevator 5 from which it is discharged at the top into the pug mill 12. Here the charge is mixed, by operation of the helical blades 13, with a suitable addition of water, preferably in small amounts (e. g., 13%–15%) regulated by hand, so as to assure complete uniform wetting of the particles of fines and dust in the charge, but at the same time to avoid any excess of water beyond such wetting, and the formation of a continuously wet, and hence just plastic mass. With this condition produced, the stiffer and firmer the charge which is formed in the pug mill, consistent with its proper operation and discharge, through the outlet 14, the better for the purposes of the present procedure and invention.

The outlet 14 of the pug mill leads into and the moist charge from it serves to seal a hermetically closed vacuum chamber 15, surrounding it, in which the charge, as consolidated and discharged from the pug mill outlet, upon leaving it is free to break up and disintegrate, either by gravity or by additional mechanical means (not shown) and fall into the inlet of an extrusion machine 16 which is also under vacuum. Where the helical blades 17 carry the charge forward to the extrusion die 18, having openings therethrough 19, which in the instant case are cylindrical, with a diameter of $\frac{7}{8}$", for example, the moist charge passing therethrough likewise constitutes a seal to the vacuum.

In operation, therefore, the thick, uniformly wet mixture effectively closes and seals the outlet from the pug mill. The vacuum in the chamber 15 facilitates the continuous delivery of the charge from the pug mill outlet and also promotes its fracture and disintegration, as it falls, by gravity, through the vacuum chamber. Such action may be further promoted by additional mechanical means, but the helical blades 17 of the extrusion machine, upon which the mixture falls will also disintegrate and loosen the mass, thus exposing the wetted particles of fines and dust to the effects of the vacuum. By such treatment, not only is occluded, entrained and adsorbed air removed from the mixture, but re-distribution of the water is effected over the surfaces of the particles, and any excessively thick films in any part of the mixture are thus thinned out by an evening distribution, and also in part by evaporation. The exhaust for maintaining the vacuum is indicated at 20, but the vacuum producing mechanism is not shown, since any apparatus, capable of providing and maintaining a vacuum of 26" of mercury or more will be suitable. The evolved gases and vapors, such as water vapor, will be thus drawn off in the usual way, and continuously separated from the charge passing through the vacuum chamber.

On the other hand, the helical blades 17 of the extrusion machine advance the stiffened wet, disintegrated, and just plastic mixture, forward to the extrusion plate or die 18. In this operation, not only is all air or other gas removed from the charge, but the wetted particles of fines and dust are thereafter permitted to come into intimate and complete contact with each other, with nothing between them but a very thin layer of liquid, water, not water vapor or air, and then increasingly compacted and finally compressed to form a mass of maximum density with respect to the geometrical conformations and relationships of the particles. Any residual interstices are filled with liquid, water, and not with air or gases, or other matter. Thus the wet particle surfaces are free to come into direct contact and lubricated to adjust themselves to one another under slight differentials of pressure and movement, but only to permit increased densification and plastic flow and not liquid flow.

As the wet mass passes through the extrusion die 18, therefore, it is not subjected to segregation, nor to the development of planes of weakness, nor to appreciable formation of slick surfaces by contact with the walls of the extrusion die. It can and will be compacted to maximum density throughout.

Upon leaving the extrusion die the continuous columns are cut into short lengths or "noodles", by a rotated cutting wire 22, mounted for example on the bow 23, carried on an arbor 24 and driven by motor 25.

The cutting wire shears off the column, at regular intervals, thus producing noodles of even sizes and lengths. Owing to the firmness or shortness of the plastic mixture, such shearing is abrupt and without distortion, and without any appreciable slicking over of the cut end surfaces.

The short columns or noodles of the raw clay mixture thus produced, are characterized by being firm, dense, or uniform size and shape, natural surfaces (that is, of the same composition and consistency as the interior of the noodle) not distorted in shape, or by stress or strain, and containing only enough water to insure uniform wet contact between the particles of which they are composed.

Noodles, as thus formed, may accordingly be subjected directly to the operation of drying and firing and are resistant to the exigencies of mechanical handling, to rapid, continuous rise of temperature, to such temperatures as may be required for hardening and developing their ultimate strength and other properties desired or to vitrification or fusing, if it should be desired.

This may be effected by delivering the raw noodles continuously into and countercurrent with a stream of hot combustion gases, controlled to afford an oxidizing atmosphere and a suitable temperature gradient. As indicated in the drawing, this may be affected by delivering the noodles into the stack 26 leading into the upper end of an inclined, rotary, refractory lined kiln 27, through which the noodles pass, by gravity, agitation, and rotation of the kiln, from the entrance end to the exit end 28. At the exit end, the combustion gases may be introduced by a portable, adjustable burner 29, for example, using gas or oil. The air supply will be regulated in part by the adjustment of the burner and also by its position before the end of the kiln. But it is also advantageous to introduce additional air in the course of the combustion gases through the kiln, as indicated at 30. This not only assures an oxidizing atmosphere (when this is desired, which is usually the case for bright, oxidation colors of coloring pigments and for the removal of darkening organic matter) but also may serve effectively to lower the temperature of the furnace gases before they come into contact with the freshly introduced, moist, raw clay noodles, and thus avoid too rapid heating and possible spalling. An inert cool gas (or steam) or reducing gases may in some cases be used for the purpose of conditioning the atmosphere of the kiln as well as for temperature control, in a similar manner.

The initial moisture in the noodles is necessary, in order to promote the preliminary densification, as well as the subsequent setting and hardening reaction of the clay fines and dust, and so long as an effectively continuous film is provided therebetween it is sufficient for this purpose. Consequently an excess over such an amount is surplusage. Furthermore, any such excess holds the particles of fines and dust apart, making a more freely plastic or fluid, and hence not shape-retaining or self-sustaining consistency, but a mass more subject to drying and shrinking cracks, spalling, and a porous, uneven structure.

Accordingly, the shaped raw clay noodles of the present invention are characterized by high density, uniform structure and surface, uniform film-wet particles of fines and dust, without excess, and shortness to cutting or fracture, without deformation. The burnt noodles are likewise dense, of uniform structure and surface, of high strength, substantially without deformation, shrinkage or spalling, and of uniform color and surface texture, both on the exterior surfaces and on fractured surfaces.

In order to preserve these properties, if desired, or necessary on account of the color values and pigments, the burnt noodles may be delivered directly into a closed rotary cooler 31, or by means of the elevator 32. In either case the noodles are cooled, preferably out of appreciable contact with the air to below the boiling point of water, e. g. 200° F. They may then be discharged to the elevator 33. This delivers them into a storage or surge hopper 34 where they may be cooled still further or to room temperature.

From the hopper 34, the noodles are drawn by gravity through the gate or chute 35 and delivered between a pair of horizontal crushing rolls 36. In the instant case, for example, with cylindrical noodles about one inch long and $\frac{3}{16}$" diameter, and for the manufacture of granules predominantly between 8 or 10 mesh and 35 mesh, these rolls are set .050" apart.

The crushed material is received by a second elevator 37, from which it is fed over sets of appropriate screens such as the two deck screens 38, 39, followed by the two deck screens 40, 41. For example, the first set of screens may be 10 mesh and 35 mesh, respectively. The over size material from the 10 mesh screen 38 will be passed by any suitable means, not shown to a second pair of horizontal crushing rolls 42. These rolls, for the same order of sizes of granule product, may be set .021" apart, and the crushed material therefrom led back into the elevator 37, for resizing along with the incoming granules.

The granules passing through the 10 mesh screen 38 and over the 35 mesh screen 39, constitute the finished product of the desired granule sizes. These may be further segregated by passing over the second set of two (or more) screens, for example, of which the upper, screen 40, has a 14 mesh screen and the lower 41, a 20 mesh screen. The output from all three screens may be delivered onto the belt conveyor 43 and delivered to ultimate storage or directly to packaging, etc., where the variation of granule sizes within this range of sizes is permissible. To regulate the proportions of the several sizes present, however, the output from the several screens in the second set may be divided into separate receptacles, or divided and combined in any required proportions, as required. Of course the specific sizes of each of the several screens used may also be selected, or varied as desired.

The fines passing through the screen 39, especially if smaller than any wanted size of granules, may be returned to storage bin 9 and added to the original mixture of incoming raw materials as above described. On the other hand, of course it may be further segregated for special purposes.

The granules thus produced by the procedure of the invention are characterized by high density, uniform structure, irregular rough fracture, predetermined, uniform color, and texture of all surfaces, whether the surfaces are formed on the noodle or by fracture, readily wetted by liquids, and adherent thereto. By the process nearly if not all of the raw material employed is converted into desired granular products of equally high commercial quality and of any given size or range of sizes desired.

The raw material used may constitute the waste material from those processes in which natural clays or shales are crushed to the granule sizes desired, which are developed into the finished product by heating, etc., while the smaller sizes or fines and dust are discarded. Such processes are advantageous in that the selected sizes of granules do not require further crushing.

On the other hand, the raw ceramic materials may be completely reduced to fines and dust and the resulting product used as the raw material in the present process. Likewise natural clays which pulverize too readily upon crushing to form granule sizes, so as to be largely reduced to the order of fines and dust, may be used. Admixtures may be made and used in the present invention, from naturally occurring shales and like hard materials, which are lacking in capacity either to bond or to harden by firing, and clays which are suitable in these respects but which tend to form an excessive proportion of fines and dust in the crushing operation.

As indicated above, the raw argillaceous fines and dust, with or without coloring oxides or previously hardened fines and dust added thereto, may be delivered into the vacuum chamber 15, without previous addition of water and accordingly in dry condition. Water may then be introduced into the chamber and thus onto the fines, while in the vacuum chamber and mixed therewith by the auger blades 17 and then extruded directly or into a second vacuum chamber (not shown) and further worked under vacuum therein, and finally extruded into a column of the desired cross-section for the formation of "noodles." These may then be hardened in the kiln and crushed to granule form, as desired. In this way not only are occluded and adsorbed gases removed from the fines and dust while dry, but still further and more completely by the wetting action of the water supplemented by the previous and simultaneous suction action of the vacuum thereon. For this purpose, water which has been freed from dissolved gases, such as waste condenser water or boiler water is especially preferable for it is thus de-gasified and prevented from introducing any gas effects into the extruded moist, plastic mixture, and permits a denser plastic granule to be made and a denser, hardened granule, in passing through the firing operation in the kiln.

I claim:

1. Method of making ceramic roofing granules, which comprises as steps exposing the surfaces of finely divided argillaceous material, which is characterized by being of a range of particle sizes of 35 mesh and finer to a vacuum of at least 26" of mercury and to uniform wetting with water in an amount corresponding to the adsorbent capacity of the material, and intimately contacting and extruding the material, while under vacuum, into a dense, continuous column, hardening, and crushing the same to granule sizes.

2. Method of making ceramic roofing granules, which comprises as steps exposing the surfaces of finely divided argillaceous material, which is characterized by being of a range of particle sizes of 35 mesh and finer to a vacuum of at least 26" of mercury and to uniform wetting with water in an amount up to approximately 15%, by weight, of the dry, argillaceous material, and intimately contacting and extruding the material, while under vacuum, into a dense, continuous column, hardening, and crushing the same to granule sizes.

3. Method of making ceramic roofing granules, which comprises as steps uniformly wetting finely divided dry, argillaceous material, which is characterized by being of a range of particle sizes of 35 mesh and finer, with water in an amount corresponding to the adsorbent capacity of the material, exposing the particles of the thus treated material to a vacuum, of at least 26" of mercury, and intimately contacting the particles and extruding the compacted material, while under vacuum, into a dense continuous column, hardening, and crushing the same to granule sizes.

4. Method of making ceramic roofing granules, which comprises as steps uniformly wetting finely divided dry, argillaceous material, which is characterized by being of a range of particle sizes of 35 mesh and finer, with water in an amount up to approximately 15%, by weight, of the dry argillaceous material, exposing the particles of the thus treated material to a vacuum, of at least 26" of mercury, and intimately contacting the particles and extruding the compacted material, while under vacuum, into a dense continuous column, hardening, and crushing the same to granule sizes.

ROBERT B. BASSETT.

REFERENCES CITED

The following references are of record in the file of this patent:

UNITED STATES PATENTS

| Number | Name | Date |
|---|---|---|
| 701,957 | Staley | June 10, 1902 |
| 1,296,472 | Brand | Mar. 4, 1919 |
| 2,007,742 | Brown | July 9, 1935 |
| 2,035,845 | Stanton | Mar. 31, 1936 |
| 2,069,059 | Fessler | Jan. 26, 1937 |
| 2,180,757 | Hermann | Nov. 21, 1939 |
| 2,344,073 | Wright | Mar. 14, 1944 |